United States Patent
Liu et al.

(10) Patent No.: US 10,135,341 B1
(45) Date of Patent: Nov. 20, 2018

(54) DUAL RAMP MODULATION FOR A SWITCH-MODE POWER SUPPLY

(71) Applicant: TEXAS INSTRUMENTS INCORPORATED, Dallas, TX (US)

(72) Inventors: Pei-Hsin Liu, Westford, MA (US); Richard Lee Valley, Nashua, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/853,205

(22) Filed: Dec. 22, 2017

Related U.S. Application Data

(60) Provisional application No. 62/533,350, filed on Jul. 17, 2017.

(51) Int. Cl.
  *H02M 3/158* (2006.01)
  *H02M 1/32* (2007.01)
  *H02M 1/08* (2006.01)
  *H02M 1/42* (2007.01)
  *G05F 1/575* (2006.01)

(52) U.S. Cl.
  CPC .......... *H02M 3/1588* (2013.01); *G05F 1/575* (2013.01); *H02M 1/08* (2013.01); *H02M 1/32* (2013.01); *H02M 1/42* (2013.01); *H02M 3/1584* (2013.01)

(58) Field of Classification Search
  CPC ........ H02M 3/1588; H02M 1/08; H02M 1/42; H02M 3/1584; G05F 1/575
  See application file for complete search history.

(56) References Cited

U.S. PATENT DOCUMENTS

| | | | | |
|---|---|---|---|---|
| 2007/0013356 A1* | 1/2007 | Qiu | ..................... | H02M 3/1584 323/288 |
| 2009/0072807 A1* | 3/2009 | Qiu | ....................... | H02M 3/156 323/285 |
| 2014/0160809 A1* | 6/2014 | Lin | .................... | H02M 3/33523 363/21.16 |
| 2014/0333278 A1* | 11/2014 | Chang | .................. | H02M 3/156 323/288 |
| 2016/0118887 A1* | 4/2016 | Zhang | .................. | H02M 3/158 323/271 |

* cited by examiner

*Primary Examiner* — Adolf Berhane
*Assistant Examiner* — Bart Iliya
(74) *Attorney, Agent, or Firm* — Tuenlap D. Chan; Charles A. Brill; Frank D. Cimino

(57) ABSTRACT

A switch-mode power supply includes a transformer, a power transistor, pulse generation circuitry, and a dual ramp modulation (DRM) circuit. The power transistor is coupled to a primary coil of the transformer. The pulse generation circuitry is configured to generate a power transistor activation signal. The DRM circuit is coupled to the pulse generation circuitry. The DRM circuit is configured to generate a leading edge blank time signal that disables inactivation of the power transistor activation signal for a predetermined interval (a leading edge blank time) after a leading edge of the power transistor activation signal. The DRM circuit is also configured to generate a reset signal that inactivates the power transistor activation signal while the leading edge blank time signal is activated.

20 Claims, 4 Drawing Sheets

DUAL RAMP MODULATION FOR A SWITCH-MODE POWER SUPPLY

CROSS-REFERENCE TO RELATED APPLICATIONS

The present application claims priority to U.S. Provisional Patent Application No. 62/533,350, filed Jul. 17, 2017, titled "Dual Ramp Modulation for High Frequency Isolated Converter," which is hereby incorporated herein by reference in its entirety.

BACKGROUND

A switch-mode power supply is an electronic circuit that converts an input direct current (DC) voltage into one or more DC output voltages that are higher or lower in magnitude than the input DC supply voltage. A switch-mode, power supply that generates an output voltage lower than the input voltage is termed a buck or step-down converter. A switch-mode power supply that generates an output voltage higher than the input voltage is termed a boost or step-up converter.

A typical switch-mode power supply includes a switch for alternately opening and closing a current path through an inductor in response to a switching signal. In operation, a DC voltage is applied across the inductor. Electrical energy is transferred to a load connected to the inductor by alternately opening and closing the switch as a function of the switching signal. The amount of electrical energy transferred to the bad is a function of the duty cycle, of the switch and the frequency of the switching signal. Switch-mode power supplies are widely used to power electronic devices, particularly battery-powered devices, such as portable cellular phones, laptop computers, and other electronic systems in which efficient use of power is desirable.

SUMMARY

Switch-mode power supplies that use dual ramp modulation to extend input voltage range while reducing audible noise and output ripple are disclosed herein. In one example, a switch-mode power supply includes a transformer, a power transistor, pulse generation circuitry, and a dual ramp modulation (DRM) circuit. The power transistor is coupled to a primary coil of the transformer. The pulse generation circuitry is configured to generate a power transistor activation signal. The DRM circuit is coupled to the pulse generation circuitry. The DRM circuit is configured to generate a leading edge blank time signal that disables inactivation of the power transistor activation signal for a predetermined interval (a leading edge blank time) after a leading edge of the power transistor activation signal. The DRM circuit is also configured to generate a reset signal that inactivates the power transistor activation signal while the leading edge blank time signal is activated.

In another example, a switch-mode power supply controller includes a drive circuit, pulse generation circuitry, and a DRM circuit. The drive circuit is configured to drive a power transistor. The pulse generation circuitry is coupled to the drive circuit and is configured to generate a power transistor activation signal. The DRM circuit is coupled to the pulse generation circuitry. The DRM circuit is configured to generate a leading edge blank time signal that disables inactivation of the power transistor activation signal for a predetermined interval (a leading edge blank time) after a leading edge of the power transistor activation signal. The DRM circuit is also configured to generate a reset signal that inactivates the power transistor activation signal while the leading edge blank time signal is activated.

In a further example, a switch-mode power supply controller includes a dual ramp modulation (DRM) circuit. The DRM circuit includes a ramp generator, a leading edge blank timer, and a power transistor reset circuit. The leading edge blank timer coupled to the ramp generator. The leading edge blank timer includes a first comparator. The first comparator includes an input terminal coupled to the ramp generator. The power transistor reset circuit is coupled to the ramp generator and the leading edge blank timer. The power transistor reset circuit includes a second comparator. The second comparator includes an input terminal that is coupled to the ramp generator.

BRIEF DESCRIPTION OF THE DRAWINGS

For a detailed description of various examples, reference will now be made to the accompanying drawings in which.

DETAILED DESCRIPTION

Figure 1:
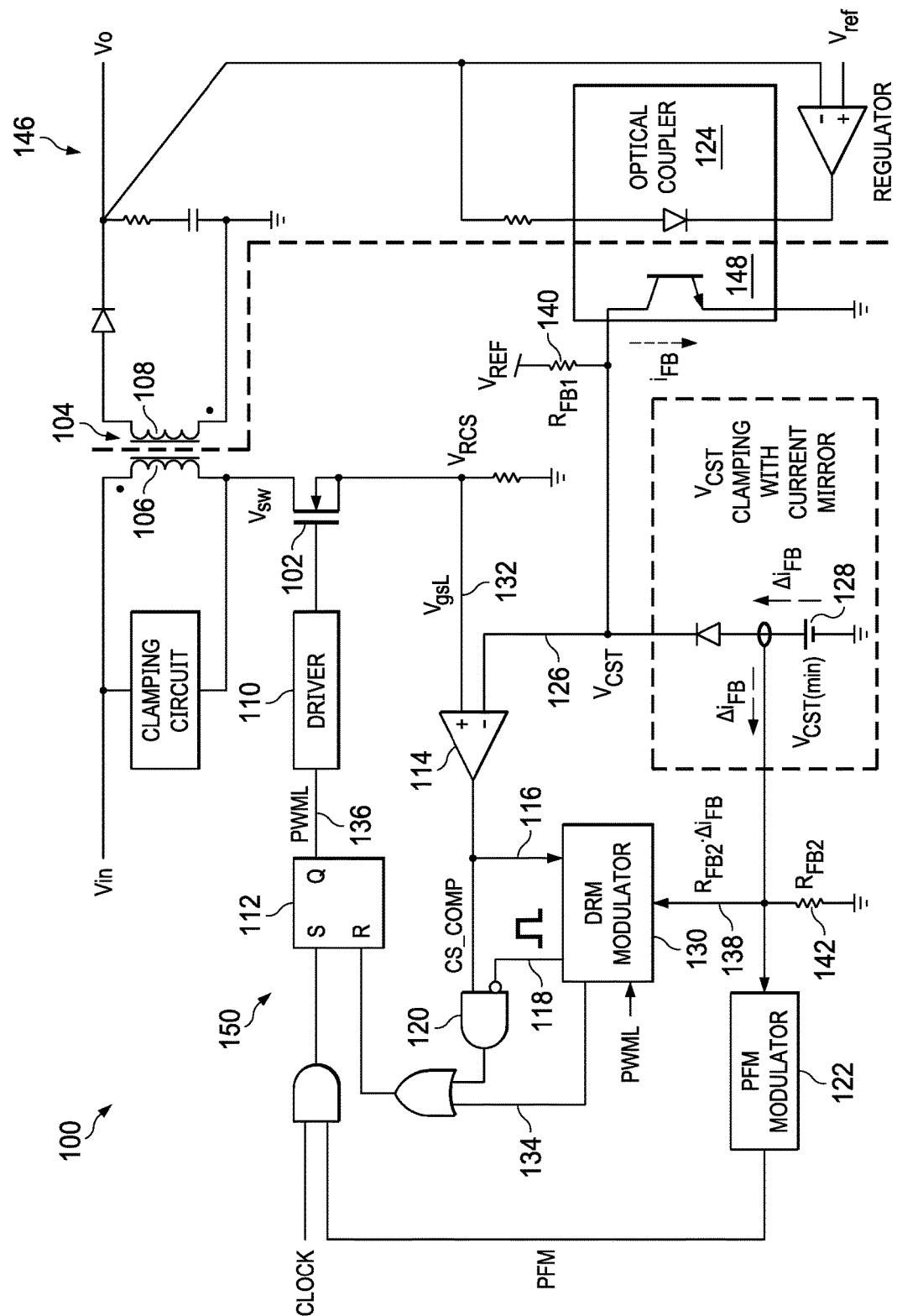
FIG. 1 shows a schematic diagram for a switch-mode power supply that includes peak current mode control with pulse frequency modulation and dual ramp modulation (DRM) circuitry in accordance with various examples.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Switch-mode power supplies are used in a wide variety of applications. In space constrained applications, where it is desirable to minimize the size of the power supply, reduction in transformer size generally requires an increase in operational frequency to maintain adequate power output. Energy efficiency is also important, and various standards and regulations mandate low levels of power dissipation under low/no-load conditions. A variety of power supply control techniques may be implemented in an attempt to reduce size and/or increase energy efficiency. However, these techniques are subject to a number of issues. Peak current mode control employs leading edge blanking that limits the high frequency operation of the power supply, which inhibits support of a wide input voltage range and hinder power supply size reduction.

Use of the pulse frequency modulation technique with peak current mode control, reduces operational switching frequency to lower power consumption with light output loads. However, the leading edge blanking time of peak current control limits minimum adjustable peak current with light output loads, and as a result audible noise can be generated and output ripple is increased when the switching frequency of the power supply falling into the audible range with a high peak current.

When power transistors with a highly non-linear junction capacitance are used, the peak current with light loads is increased, which in turn further increases audible noise and output voltage ripple. With limitations imposed by leading-edge blanking, use of the burst frequency modulation technique with peak current control and high peak current also increases audible noise and output voltage ripple.

The switch-mode power supplies and control circuitry disclosed herein employ dual ramp modulation (DRM) circuitry that extends input voltage range in high frequency operation to enable high density power supplies, while reducing audible noise and output ripple under light loading conditions. The DRM circuitry applies a ramp generator to produce timing for leading edge blanking and timing for power transistor drive pulses that are shorter than and terminate during the leading edge blanking. The shorter, controllable power transistor drive pulses provide a controllable narrow pulse width at higher input voltage conditions, which generate low enough peak currents to reduce audible noise and output voltage ripple in light output loading conditions. The DRM circuitry monitors the relationship of the feedback signal from the secondary-side output-voltage regulation loop to the current-sensing signal on the primary-side power transistor source terminal, and generates the shorter power transistor drive pulses based on the current-sensing voltage exceeding a voltage derived from the secondary side feedback at the end of the leading edge blanking. The DRM circuitry is applicable to peak current mode control, pulse frequency modulation, burst frequency modulation, and other switch-mode power supply control techniques.

FIG. 1 shows a schematic diagram for a switch-mode power supply 100 that includes peak current mode control with pulse frequency modulation and dual ramp modulation (DRM) circuitry in accordance with various examples. The switch-mode power supply 100 includes a power transistor 102, a transformer 104, a transistor driver 110, a flip-flop 112, a comparator 114, a pulse frequency modulator 122, an optical coupler 124, a DRM circuit 130, and various other components. The transformer 104 isolates the load circuits powered by the switch-mode power supply 100 from the power source (e.g., an alternating current power main) that powers the switch-mode power supply 100, and includes a primary winding 106 and a secondary winding 108.

The primary winding 106 of the transformer 104 is coupled to the power transistor 102. In some implementations, the power transistor 102 is a metal oxide semiconductor field effect transistor (MOSFET), or a superjuction MOSFET. Activation of the power transistor 102 causes current to flow in the primary winding 106 of the transformer 104, which in turn generates a magnetic field about the secondary winding 108 of the transformer 104. When the power transistor 102 is inactive, the magnetic field collapses, and current flows in the secondary winding 108. The power transistor 102 is controlled via drive circuit 110 that forwards a power transistor activation signal PWML 136 (e.g., with level shifting) to a control terminal (e.g., a gate terminal) of the power transistor 102.

The power transistor activation signal pulse width modulator low (PWML), which controls the power transistor 102, is generated by pulse generation circuitry 150 that includes the flip-flop 112. The power supply activation signal PWML is so named by reference to use of the signal to drive the power transistor 102 that couples the inductor 104 to ground. The flip-flop 112 is set by a clock signal 144 to activate PWML at a frequency established by the clock signal 144. The pulse generation circuitry 150 applies feedback from the secondary side 146 of the transformer 104 (i.e., the load circuit side of the transformer 104) and the current-sense resistor voltage $V_{RCS}$ (current sensing voltage) on the source terminal of the power transistor 102 to inactivate PWML. The optical coupler 124 is part of an output voltage regulation loop on the secondary side 146 of the transformer 104, and transfers signals related to the power supply voltage on the secondary side 146 of the transformer 104 to the pulse generation circuitry 150 of the switch-mode power supply 100. Current flowing (feedback current) in the primary side 148 of the optical coupler 124, through the resistor 140 produces a feedback voltage $V_{CST}$. The reference 128 is used to establish a minimum voltage of $V_{CST}$. When $V_{CST}$ reaches the minimum level ($V_{CST(min)}$), some of the iFB feedback current ($\Delta_{iFB}$) from optical coupler flows through the reference 128.

The comparator 114 compares the current-sense resistor voltage $V_{RCS}$ on the source terminal of the power transistor 102 and the voltage $V_{CST}$ generated by feedback from the secondary side 146 of the transformer 104. When the current-sense resistor voltage $V_{RCS}$ on the source terminal of the power transistor 102 exceeds the voltage $V_{CST}$ generated by feedback from the secondary side 146 of the transformer 104, the output of the comparator 114 is activated to inactivate the power transistor activation signal PWML. However, inactivation of PWML is inhibited for a predetermined interval after the leading edge of PWML.

Figure 2:
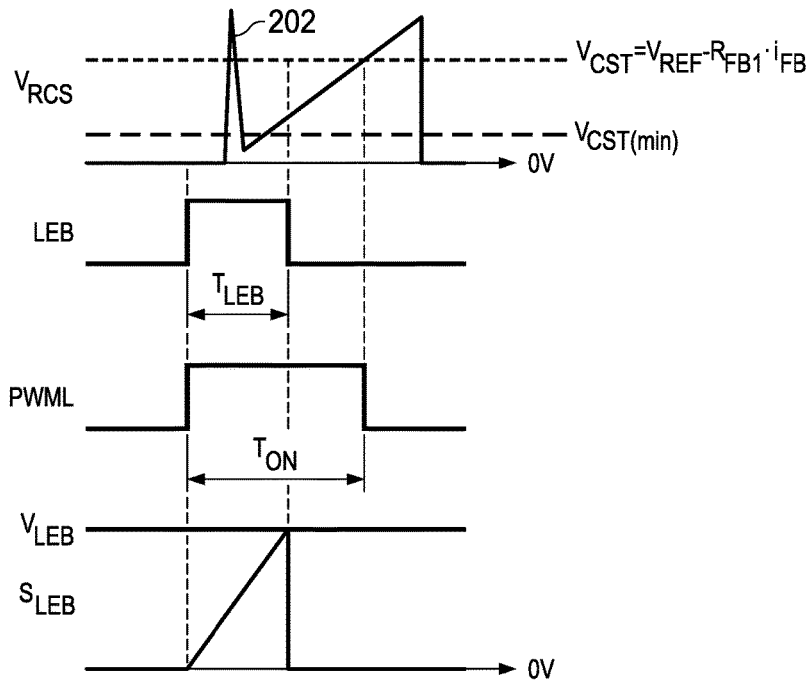
FIG. 2 shows signals for produced by current ramp modulation in accordance with various examples.

FIG. 2 shows signals produced in the switch-mode power supply 100. The power transistor activation signal PWML activates or turns on the power transistor 102. Accordingly, the time during which PWML is activated is labeled $T_{on}$. At initial activation of the power transistor 102, by activation of PWML, a transient 202 is induced in the current-sense resistor voltage $V_{RCS}$ on the source terminal of the power transistor 102. To inhibit inactivation of PWML due to the transient 202, the output of the comparator 114 is gated with a leading edge blanking signal 118 (LEB). The signal LEB inhibits inactivation of PWML for a predetermined time interval ($T_{LEB}$) following the leading edge of PWML. Thus, in implementations of a switch-mode power supply that lack the DRM circuit 130, PWML may be no shorter than $T_{LEB}$ which limits the minimum current provided by the switch-mode power supply 100 to a higher value than may be needed under light load conditions, and, in turn, may result in increased audio noise and output voltage ripple.

The pulse frequency modulator 122 is enabled in light load conditions to reduce the switching frequency of the switch-mode power supply 100, which improves efficiency in light load conditions. The pulse frequency modulator 122 is enabled based on the voltage on signal 138. The voltage of signal 138 is a function of feedback current $\Delta_{iFB}$ flowing from the reference 128 that establishes a minimum voltage of $V_{CST}$ through resistor 142. The pulse frequency modulator 122 may compare the voltage of signal 138 to a reference voltage to trigger activation of PWML, and thereby reduce the frequency of PWML generation as loading decreases. For example, the output PFM of the pulse frequency modulator 122 may be applied to gate the clock signal input to the flip-flop 112 and reduce the frequency of PWML 136. Some implementations of the switch-mode power supply 100 may not include the pulse frequency modulator 122.

Figure 3:
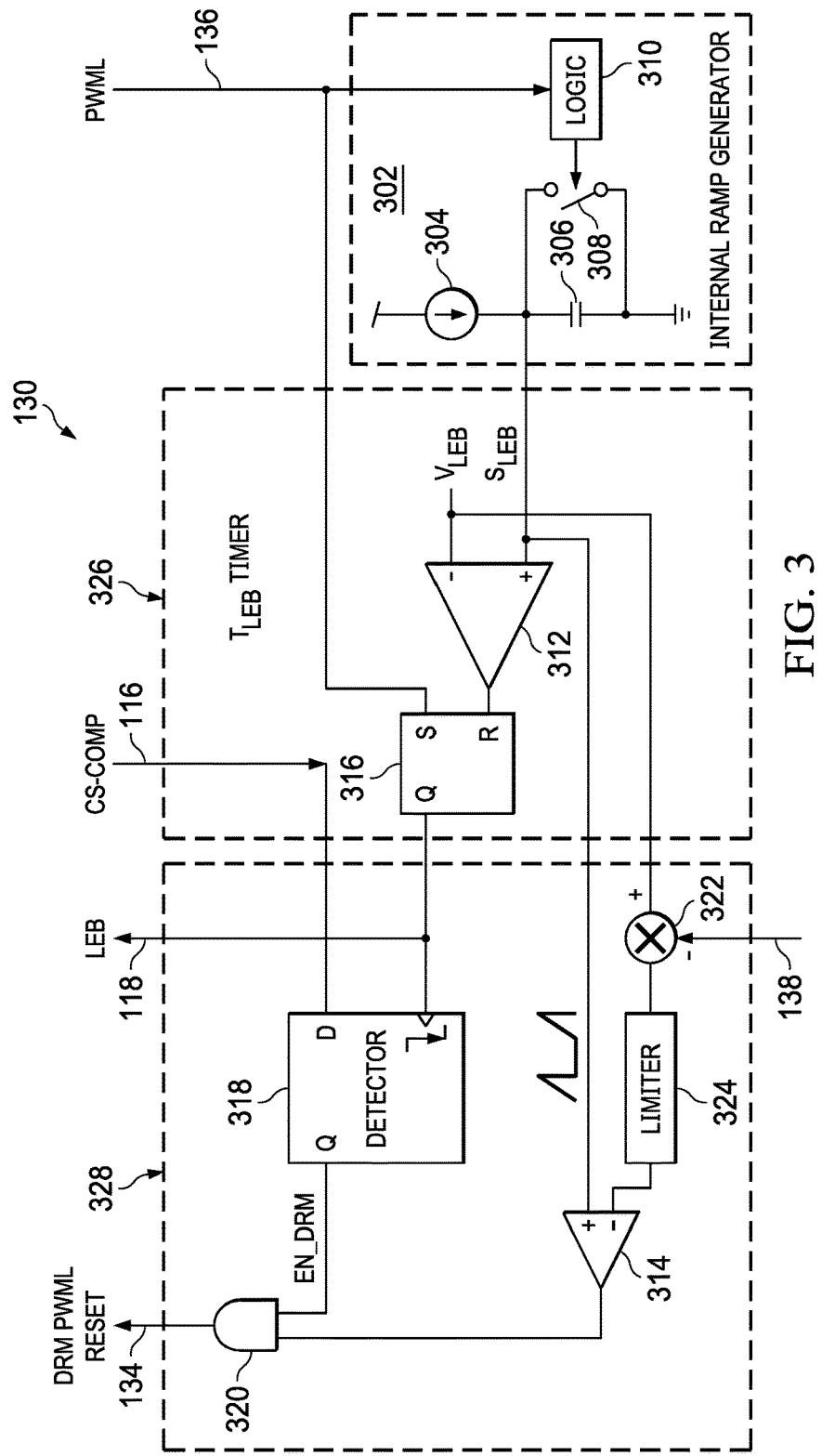
FIG. 3 shows a block diagram for DRM circuitry in accordance with various examples.

To enable provision of PWML pulses of shorter duration than the leading edge blanking time, implementations of the switch-mode power supply 100 include the DRM circuit 130. FIG. 3 shows a block diagram for DRM circuit 130 in accordance with various examples. The DRM circuit 130 includes a ramp generator 302, a leading edge blank timer ($T_{LEB}$ timer) 326, and a power transistor reset circuit 328. The ramp generator 302 produces a voltage ramp that is compared to various thresholds in the DRM circuit 130 to provide timing. The ramp generator 302 includes a capacitor 306, a current source 304, a switch 308, and logic 310. The logic 310 controls the switch 308. The logic 310 closes the switch 308 to reset the ramp voltage to zero, and opens the switch 308 to allow ramp voltage to increase by allowing the current source 304 to charge the capacitor 306. Activation of PWML triggers ramp generation by causing the logic 310 to open the switch 308.

The leading edge blank timer 326 is coupled to the ramp generator 302, and generates the leading edge blank time signal 118 (LEB) based on the voltage ramp ($S_{LEB}$) received from the ramp generator 302. The leading edge blank timer 326 includes a comparator 312 and a flop-flop 316. The comparator 312 compares ramp voltage to a predetermined threshold voltage $V_{LEB}$ set to produce a desired leading edge blank time. The flip-flop 316 is set by the leading edge of PWML to activate LEB, and the output of the comparator 312 is activated when the ramp voltage exceeds $V_{LEB}$ to reset the flip-flop 316 and inactivate LEB.

The power transistor reset circuit 328 is also coupled to ramp generator 302, and uses the voltage ramp produced by the ramp generator 302 to generate a reset signal 134 for inactivating PWML while LEB is activated (i.e., for generating PWML that is shorter than the leading edge blanking time). The power transistor reset circuit 328 includes a comparator 314, summation circuit 322, limiter 324, flip-flop 318 and gate 320. The summation circuit 322 subtracts the voltage across resistor 142 (FIG. 1) from the leading edge blanking threshold voltage $V_{LEB}$. Output voltage of the summation circuitry 322 is provided to the comparator 314 via the limiter 324. The limiter 324 constrains the threshold voltage provided to the comparator 314 to at least a predetermined minimum voltage. If the voltage produced by the summation circuitry 322 exceeds the predetermined minimum voltage, then the limiter 324 passes the voltage produced by the summation circuitry 322 to the comparator 314. However, if the voltage produced by the summation circuitry 322 does not exceed the predetermined minimum voltage, then the limiter 324 passes the predetermined minimum voltage to the comparator 314. The comparator 314 compares the voltage ramp received from the ramp generator 302 to the threshold voltage provided by the limiter 324. When the voltage ramp exceeds the threshold voltage, the output of the comparator 314 produces a signal for inactivating PWML during the leading edge blanking time.

The power transistor reset circuit 328 included detector circuitry that enables resetting of the PWML during the leading edge blanking time only if the current-sense resistor voltage $V_{RCS}$ at the source terminal of the power transistor 102 exceeds the voltage generated by feedback from the secondary side 146 of the transformer 104 (e.g., only if the output of the comparator 114 is high) at the end of the leading edge blanking time. At the trailing edge of the leading edge blanking signal 118, the flip-flop 318 samples the output of the comparator 114. If the output of the comparator 114 is high at the trailing edge of the leading edge blanking signal 118, then gate 320 enables the output of the comparator 314 to inactivate PWML during a subsequent leading edge blanking time. If the output of the comparator 114 is low at the trailing edge of the leading edge blanking signal 118, then gate 320 inhibits the output of the comparator 314 from inactivating PWML during a subsequent leading edge blanking time. Some implementations of the power transistor reset circuit 328 also include circuitry to enable inactivation of PWML during the leading edge blanking time only if the voltage generated by feedback from the secondary side of the transformer 104 is no greater than a predetermined minimum voltage (e.g., $V_{CST(min)}$).

Figure 4:
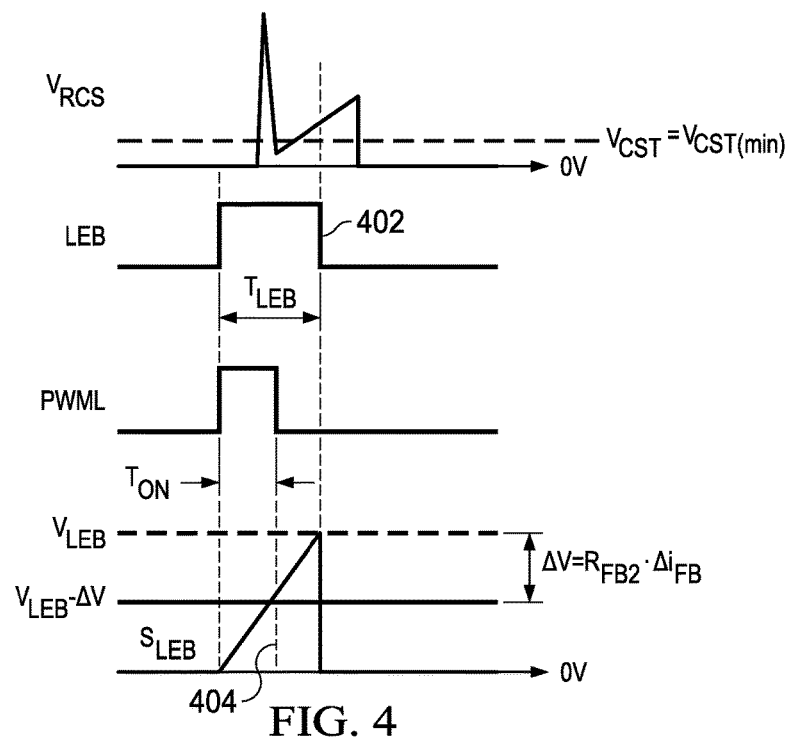
FIG. 4 shows signals produced by DRM circuitry in accordance with various examples.

FIG. 4 shows signals produced by the DRM circuit 130 in accordance with various examples. In FIG. 4, $V_{CST}$ (the voltage generated by feedback from the secondary side 146 of the transformer 104) is equal to $V_{CST(min)}$. Activation of PWML initiates generation of the timing ramp voltage $S_{LEB}$, and initiates generation of the leading edge blanking signal LEB. The comparator 312 resets the flip-flop 316 when the voltage of the timing ramp $S_{LEB}$ exceeds the threshold voltage $V_{LEB}$ to end the leading edge blanking time and generate the trailing edge 402 of the leading edge blanking time signal LEB. At the trailing edge 402 of the leading edge blanking time signal LEB, the flip-flop 318 samples the output of comparator 114 (FIG. 1), which compares the current-sense resistor voltage $V_{RCS}$ at the source terminal of the power transistor 102 to the voltage generated by feedback from the secondary side 146 of the transformer 104, $V_{CST}$. In FIG. 4, $V_{RCS}$ exceeds $V_{CST}$ at the trailing edge 402 of the leading edge blanking time signal LEB, and the flip-flop 318 enables the logic gate 320 to pass a PWML reset signal generated by the comparator 314.

In FIG. 4, an immediately previous cycle of LEB also enabled the logic gate 320 to pass a PWML reset signal generated by the comparator 314, and the power transistor reset circuit 328 resets PWML during the leading edge blanking time in FIG. 4. The comparator 314 compares the timing voltage ramp $S_{LEB}$ to the voltage received from the limiter 324 ($V_{LEB}-R_{FB2}*\Delta_{iFB}$). At time 404, when the timing ramp voltage $S_{LEB}$ exceeds the voltage received from the limiter 324, the output of the comparator 314 is activated and power transistor activation signal PWML is inactivated during the leading edge blanking time.

Figure 5:
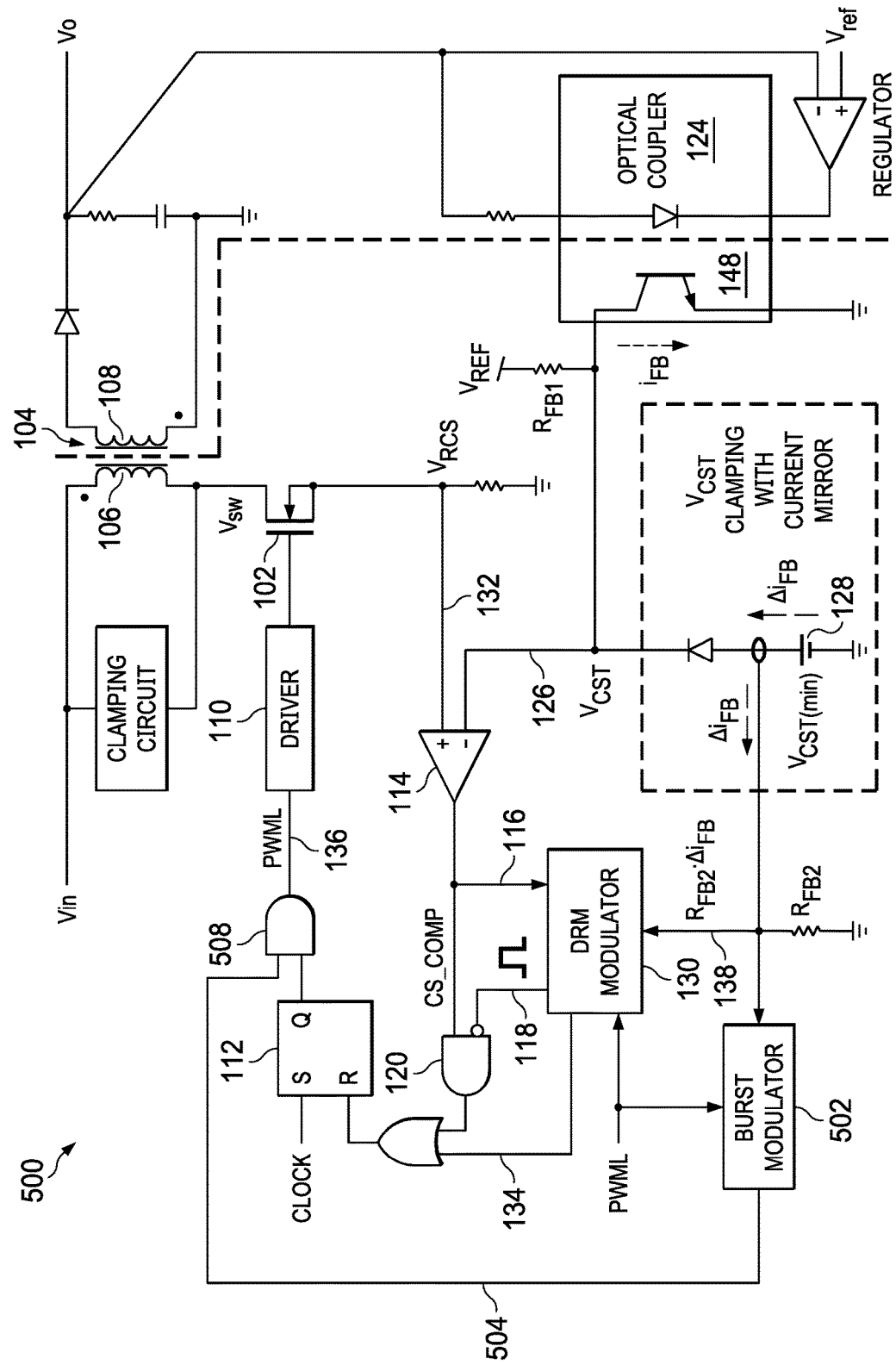
FIG. 5 shows a schematic diagram for a switch-mode power supply that includes peak current mode control with burst frequency modulation and DRM circuitry in accordance with various examples.

FIG. 5 shows a schematic diagram for a switch-mode power supply 500 that includes peak current mode control with burst frequency modulation and a DRM circuit in accordance with various examples. The switch-mode power supply 500 is similar to the switch-mode power supply 100. The switch-mode power supply 500 differs from the switch-mode power supply 100 in that the switch-mode power supply 500 includes a burst modulator 502, rather than the pulse frequency modulator 122 of the switch-mode power supply 100. The output of the burst modulator 502 enables and disables the output of the flip-flop 112 via gate 508 to generate PWML pulses in bursts.

The burst modulator 502 may compare the voltage of signal 138 to a reference voltage to determine whether to trigger generation of a set of PWML pulses. To generate a set PWML pulses, the burst modulator 502 activates signal 504 to allow generation of a number of PWML pulses. The burst modulator 502 inactivates signal 504 to inhibit generation of a PWML pulses. As the output load is lightened, the burst modulator 502 reduces burst frequency by increasing the time between bursts of PWML pulses (i.e., the time that the signal 504 is inactivated).

The DRM modulator 130 operates as described above to generate PWML pulses that are shorter in duration than the leading edge blanking time when the switch-mode power supply 500 is lightly loaded.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A switch-mode power supply, comprising:
a transformer;
a power transistor coupled to a primary coil of the transformer;
pulse generation circuitry configured to generate a power transistor activation signal;
a dual ramp modulation (DRM) circuit coupled to the pulse generation circuitry, the DRM circuit configured to:
generate a leading edge blank time signal that disables inactivation of the power transistor activation signal for a predetermined interval after a leading edge of the power transistor activation signal; and
generate a reset signal that inactivates the power transistor activation signal while the leading edge blank time signal is activated.

2. The switch-mode power supply of claim 1, wherein the DRM circuit comprises a ramp generator configured to generate a ramp voltage while the power transistor activation signal is activated.

3. The switch-mode power supply of claim 2, wherein the DRM circuit comprises a first comparator configured to inactivate the leading edge blank time signal based on the ramp voltage exceeding a first threshold.

4. The switch-mode power supply of claim 3, wherein the DRM circuit comprises a second comparator configured to generate the reset signal based on the ramp voltage exceeding a second threshold.

5. The switch-mode power supply of claim 4, wherein the second threshold is based on the first threshold reduced as a function of feedback current in an optical coupler induced by an output voltage regulation loop on a secondary side of the transformer.

6. The switch-mode power supply of claim 1, further comprising a comparator configured to compare a current sensing voltage at a source terminal of the power transistor to a voltage generated as a function of feedback current in optical coupler induced by an output voltage regulation loop on a secondary side of the transformer.

7. The switch-mode power supply of claim 6, wherein the DRM circuit comprises detector circuitry configured to enable the reset signal to inactivate the power transistor activation signal while the leading edge blank time signal is activated responsive to an output of the comparator indicating that the current sensing voltage at the source terminal of the power transistor is greater than a threshold voltage at a trailing edge of the leading edge blank time signal.

8. The switch-mode power supply of claim 7, wherein the detector circuitry is configured to enable the reset signal to inactivate the power transistor activation signal while the leading edge blank time signal is activated responsive to the threshold voltage being no greater than a predetermined minimum voltage.

9. A switch-mode power supply controller, comprising:
a drive circuit configured to drive a power transistor;
pulse generation circuitry coupled to the drive circuit and configured to generate a power transistor activation signal; and
a dual ramp modulation (DRM) circuit coupled to the pulse generation circuitry, the DRM circuit configured to:
generate a leading edge blank time signal that disables inactivation of the power transistor activation signal for a predetermined interval after a leading edge of the power transistor activation signal; and
generate a reset signal that inactivates the power transistor activation signal while the leading edge blank time signal is activated.

10. The switch-mode power supply controller of claim 9, wherein the DRM circuit comprises a ramp generator configured to generate a ramp voltage while the power transistor activation signal is activated.

11. The switch-mode power supply controller of claim 10, wherein the DRM circuit comprises a first comparator configured to inactivate the leading edge blank time signal based on the ramp voltage exceeding a first threshold.

12. The switch-mode power supply controller of claim 11, wherein the DRM circuit comprises a second comparator configured to generate the reset signal based on the ramp voltage exceeding a second threshold.

13. The switch-mode power supply controller of claim 12, wherein the second threshold is based on the first threshold reduced as a function of feedback current in an optical coupler induced by an output voltage regulation loop on a secondary side of a transformer coupled to the power transistor.

14. The switch-mode power supply controller of claim 9, further comprising a comparator configured to compare a current sensing voltage at a source terminal of the power transistor to a threshold voltage generated as a function of feedback current in an optical coupler induced by an output voltage regulation loop on a secondary side of a transformer coupled to the power transistor.

15. The switch-mode power supply controller of claim 14, wherein the DRM circuit comprises detector circuitry configured to enable the reset signal to inactivate the power transistor activation signal while the leading edge blank time signal is activated responsive to an output of the comparator indicating that the current sensing voltage at the source terminal of the power transistor is greater than the threshold voltage at a trailing edge of the leading edge blank time signal.

16. The switch-mode power supply controller of claim 15, wherein the detector circuitry is configured to enable the reset signal to inactivate the power transistor activation signal while the leading edge blank time signal is activated responsive to the threshold voltage being no greater than a predetermined minimum voltage.

17. A switch-mode power supply controller, comprising:
a dual ramp modulation (DRM) circuit, comprising:
a ramp generator;
a leading edge blank timer coupled to the ramp generator, the leading edge blank timer comprising:
a first comparator comprising an input terminal coupled to the ramp generator; and
a power transistor reset circuit coupled to the ramp generator and the leading edge blank timer, the power transistor reset circuit comprising:
a second comparator comprising an input terminal coupled to the ramp generator.

18. The switch-mode power supply control circuit of claim 17, further comprising:
- a first flip-flop; and
- a third comparator comprising an output that is coupled to the DRM circuit and to an input of the flip-flop.

19. The switch-mode power supply control circuit of claim 17, wherein the power transistor reset circuit comprises:
- a second flip-flop comprising:
  - a first input that is coupled to the output of the third comparator; and
  - a second input that is coupled to an output of the leading edge blank timer.

20. The switch-mode power supply control circuit of claim 19, wherein the power transistor reset circuit comprises:
- a gate comprising:
  - a first input that is coupled to an output of the second flip-flip;
  - a second input that is coupled to an output of the second comparator; and
  - an output that is coupled to the first flop-flop.

\* \* \* \* \*